United States Patent
Walton et al.

(10) Patent No.: US 12,098,097 B2
(45) Date of Patent: Sep. 24, 2024

(54) METHOD OF PREPARING A GYPSUM-BASED PRODUCT

(71) Applicant: SAINT-GOBAIN PLACO, Courbevoie (FR)

(72) Inventors: Kirsty Walton, Coventry (GB); Nicholas Jones, Coventry (GB); David Cutler, Coventry (GB); Nicola Jupp, Coventry (GB); Laura Brooks, Coventry (GB)

(73) Assignee: Saint-Gobain Placo, Courbevoie (FR)

( * ) Notice: Subject to any disclaimer, the term of this patent is extended or adjusted under 35 U.S.C. 154(b) by 722 days.

(21) Appl. No.: 17/293,337

(22) PCT Filed: Nov. 7, 2019

(86) PCT No.: PCT/EP2019/080599
§ 371 (c)(1),
(2) Date: May 12, 2021

(87) PCT Pub. No.: WO2020/099243
PCT Pub. Date: May 22, 2020

(65) Prior Publication Data
US 2022/0009832 A1 Jan. 13, 2022

(30) Foreign Application Priority Data
Nov. 15, 2018 (GB) .................................. 1818653

(51) Int. Cl.
*C04B 16/04* (2006.01)
*B28C 5/40* (2006.01)
(Continued)

(52) U.S. Cl.
CPC .............. *C04B 16/04* (2013.01); *B28C 5/402* (2013.01); *B28C 5/406* (2013.01); *C04B 14/42* (2013.01);
(Continued)

(58) Field of Classification Search
CPC combination set(s) only.
See application file for complete search history.

(56) References Cited

U.S. PATENT DOCUMENTS 4,137,198 A * 1/1979 Sachs ...................... C04B 28/02
521/154
5,305,577 A * 4/1994 Richards ................. B32B 13/04
428/218
(Continued)

FOREIGN PATENT DOCUMENTS

| FR | 2166536 | 8/1973 |
| GB | 918647 | 2/1963 |
| WO | WO 2017/174991 | 10/2017 |

OTHER PUBLICATIONS

Grafting and abs of PVA in vinyl acetate emulsion polymerization (Year: 2004).*
(Continued)

*Primary Examiner* — Peter A Salamon
(74) *Attorney, Agent, or Firm* — McDonnell Boehnen Hulbert & Berghoff LLP

(57) ABSTRACT

A method of preparing a gypsum-based product comprises the steps of mixing calcined gypsum with polymer particles and water to provide a slurry. The polymer particles comprise principally polyvinyl acetate, and have a particle size distribution, measured using laser diffractometry, such that particles having a diameter of 4.5 μm or less provide at least 90% of the total particle volume.

12 Claims, 4 Drawing Sheets

Example 1

Example 2

Figure 2:
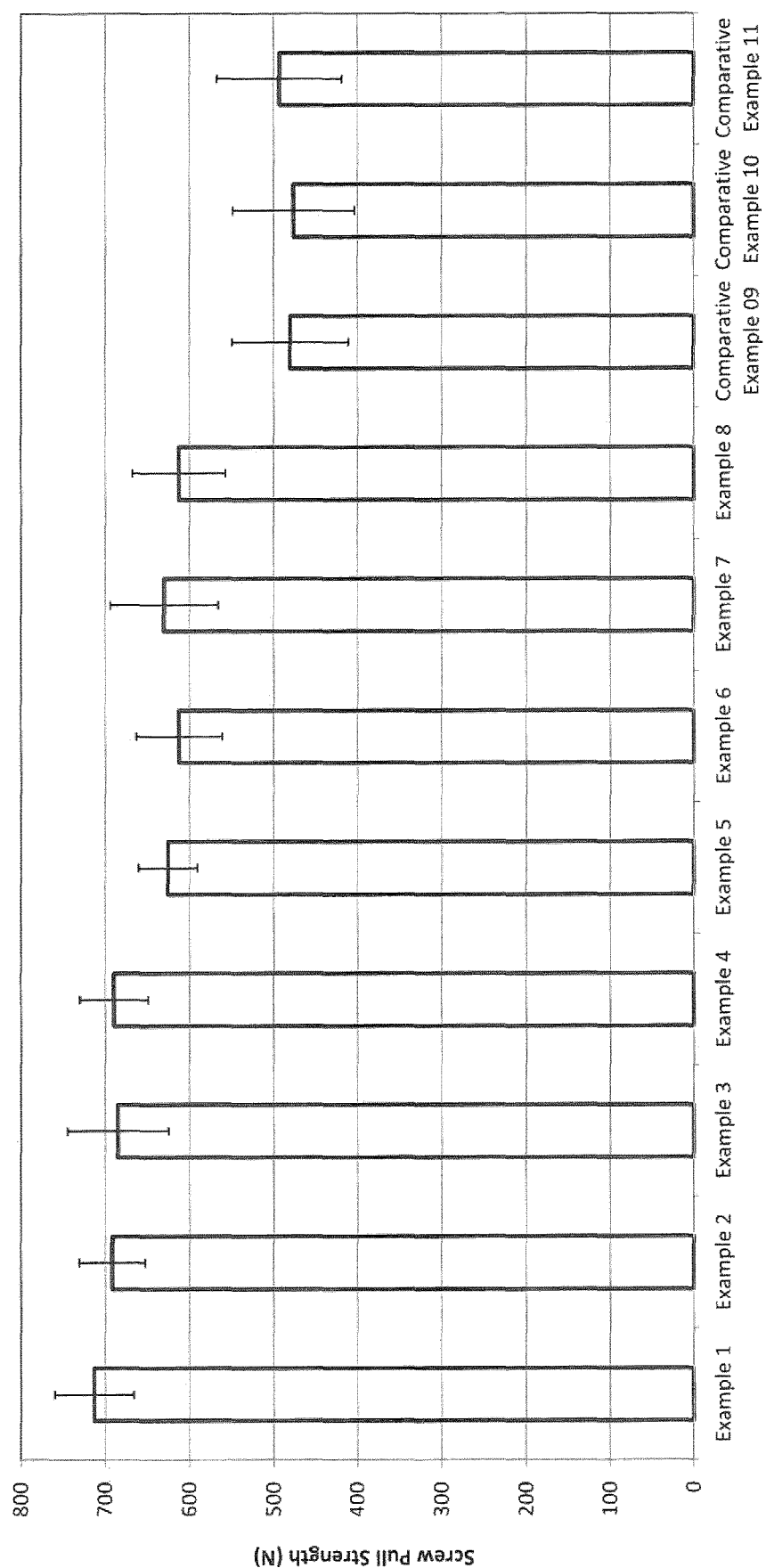

(51) Int. Cl.
*C04B 14/42* (2006.01)
*C04B 20/10* (2006.01)
*C04B 28/14* (2006.01)
*B28B 19/00* (2006.01)
*C04B 111/00* (2006.01)

(52) U.S. Cl.
CPC .......... *C04B 20/1033* (2013.01); *C04B 28/14* (2013.01); *B28B 19/0092* (2013.01); *C04B 2111/00629* (2013.01)

(56) References Cited

U.S. PATENT DOCUMENTS

| | | | | |
|---|---|---|---|---|
| 5,441,585 | A * | 8/1995 | Rodda | C04B 28/14 106/778 |
| 6,319,312 | B1 * | 11/2001 | Luongo | E04C 2/043 156/39 |
| 2006/0272764 | A1 * | 12/2006 | Smith | C04B 28/14 156/204 |
| 2015/0307397 | A1 * | 10/2015 | Bouteiller | C04B 28/14 264/299 |
| 2016/0096772 | A1 * | 4/2016 | Hotchin | C04B 16/04 428/326 |
| 2017/0334784 | A1 * | 11/2017 | Brooks | C04B 28/14 |
| 2017/0335565 | A1 * | 11/2017 | Brooks | E04C 2/043 |

OTHER PUBLICATIONS

Uses and manufacture of gypsum (Year: 2018).*
Hagiwara et al., "Acetate Emulsion," The Journal of the Rubber Association of Japan, 36(2), 144-147 (1963) (provided with English translation of the Abstract only).
Technical Data Sheet, "Mowilith DHS S1," Celanese Emulsion Polymers, publication date Feb. 8, 2013.
Anonymous: "Emulsion Innovation for Glass Fiber", Celanese Emulsion Polymers: Global Emulsions Guide, Jan. 1, 2012, pp. 1-8, XP055665245.
International Search Report and Written Opinion dated Feb. 11, 2020 for International Application No. PCT/EP2019/080599, 14 pages.
Furuta, "The morphology of ethylene-vinyl acetate emulsion," The Journal of Colloid and Interface Science, 59(1), 76-83 (1977).

* cited by examiner

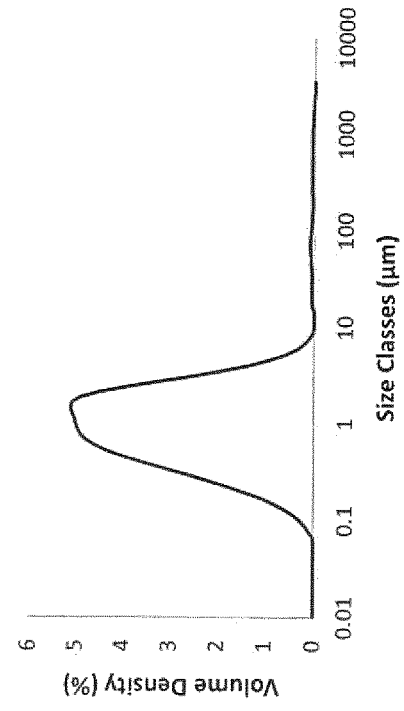
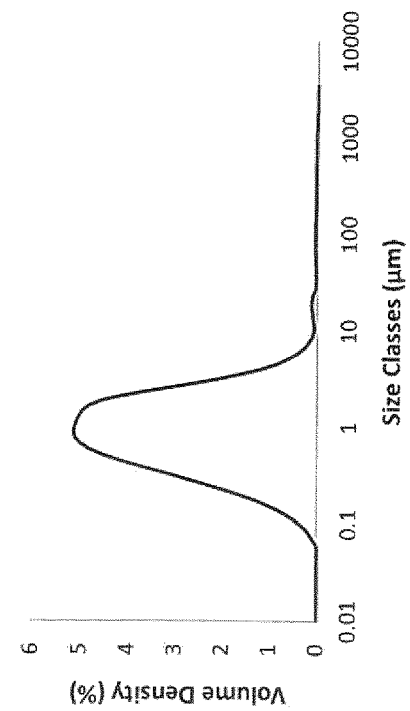
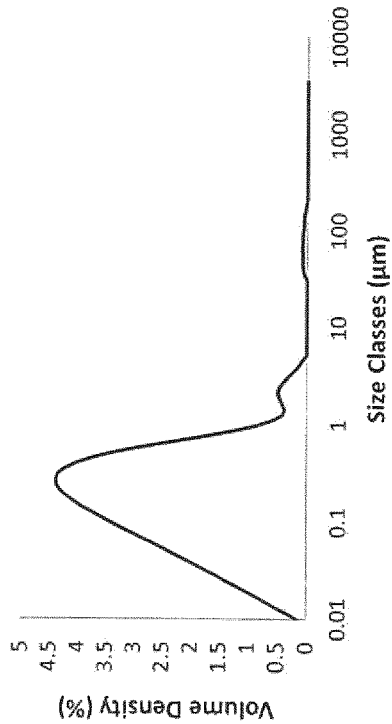
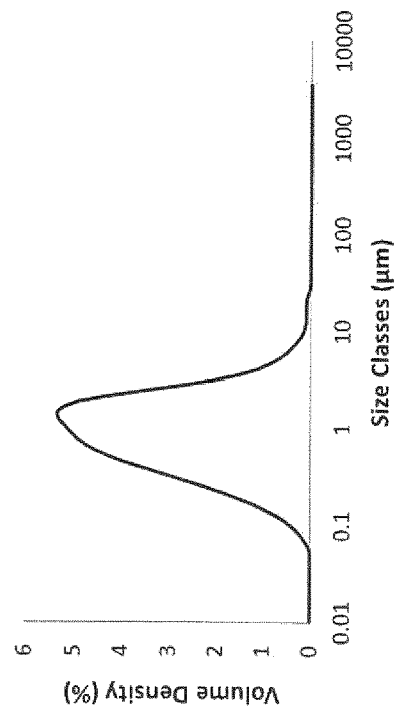

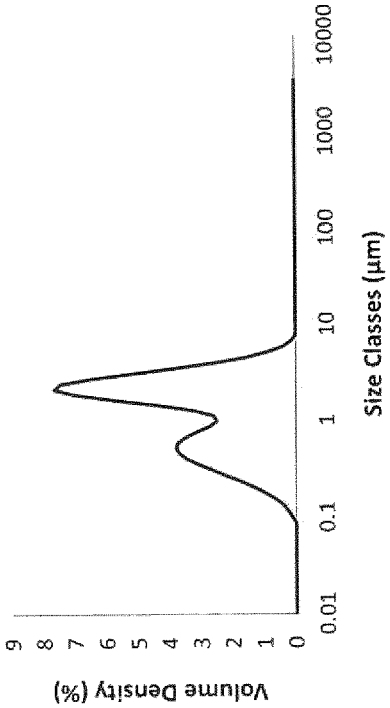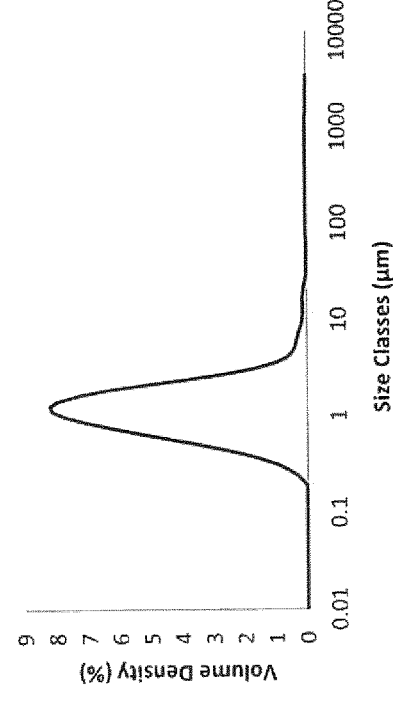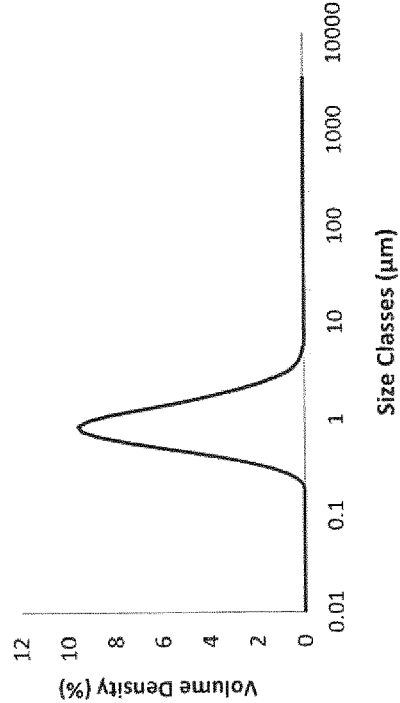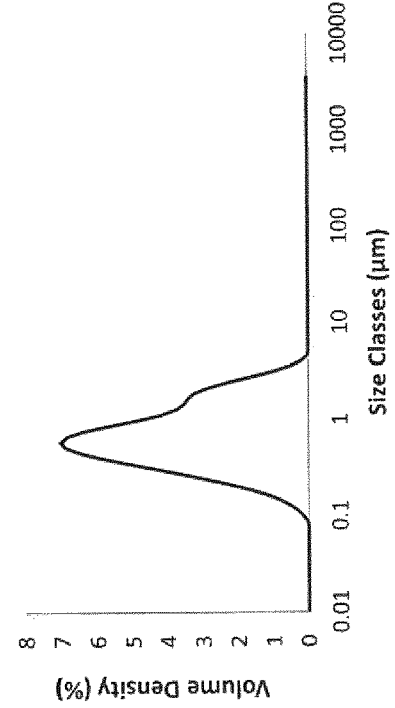
Fig. 1(e): Example 5
Fig. 1(f): Example 6
Fig. 1(g): Example 7
Fig. 1(h): Example 8

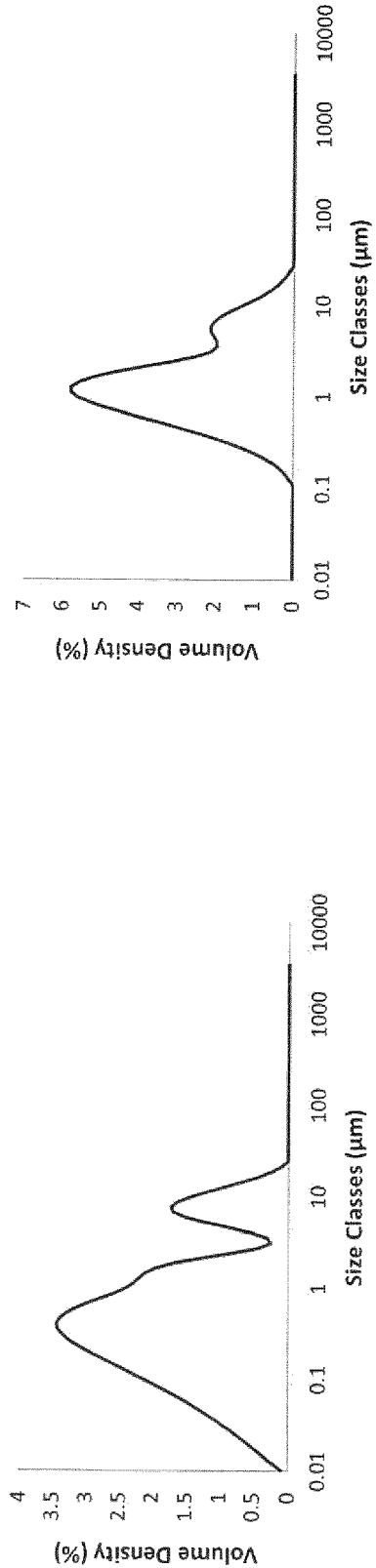
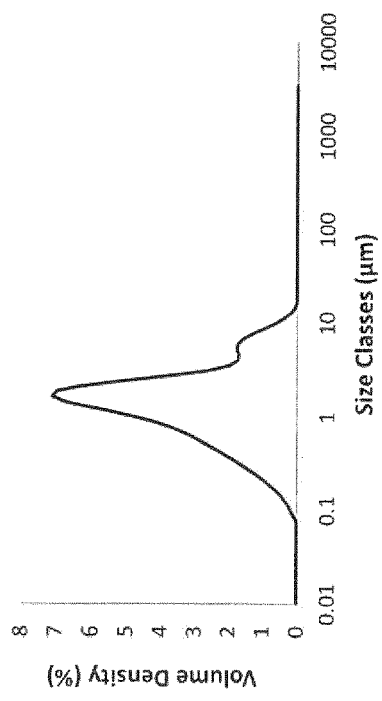

METHOD OF PREPARING A GYPSUM-BASED PRODUCT

This application is a U.S. national phase application of International Patent Application no. PCT/EP2019/080599 filed Nov. 7, 2019, which claims the benefit of European Patent Application no. 1818653.6 filed Nov. 15, 2018.

The present invention relates to a method of preparing a gypsum-based product comprising a polymer additive, in particular to a method of preparing a gypsum-based product comprising polyvinyl acetate.

Light-weight panels such as plasterboard (e.g. gypsum plasterboard), polystyrene board and fibreboard are commonly used to provide partitions within buildings. Their advantages for this application include the fact that they are light and quick to install.

However, in certain cases, such light-weight panels may have the drawback that they are not strong enough to support fixtures (e.g. sinks, televisions, radiators, fire extinguishers, shelves and any other item that requires attachment to the panel) when the fixing means (e.g. a screw) is inserted directly into the panel, that is, without the presence of an insert such as a wall plug or anchor. In such cases, the weight of the fixture may cause the fixing means (e.g. a screw) to be pulled out of the panel, such that the fixture falls away from the partition.

Typically, this problem has been addressed by providing plywood sheets to increase the fixing strength of the panel. In this case, the plywood sheet is provided on the side of the panel opposite to that on which the fixture is to be located. The plywood sheet may provide increased strength for retaining one or more fixing means (e.g. screws) employed to secure the fixture to the panel. Typically, the plywood sheet is positioned within the partition framework, and the plasterboard then fixed to the plywood, so that it lies outside the partition framework.

As an alternative, metal support means may be provided. These may comprise fixing plates, channels, straps, or metal fasteners. As is the case for plywood sheets, the metal support means are generally positioned on the side of the panel opposite that to which the fixture is to be secured, and act to receive and secure fixing means, e.g. fixing screws, that are used to attach the fixture to the panel.

Both these arrangements have the disadvantage that they require the panels and the additional supporting components to be affixed to each other on-site. Moreover, when metal support means are used, a plurality of such support means may be needed to support the full set of fixing means required to secure the fixture to the panel. Thus, the installation process may be time-consuming and expensive.

Furthermore, the addition of metal support means or plywood sheets increases the weight and thickness of the partition, and/or results in a reduction in cavity wall space. In general, the plywood itself must be cut to size on site, thus increasing the time required for installation and possibly leading to the release of dust and potentially harmful components.

Therefore, there is a need to provide improved panels that are able to retain fixing means and support fixtures, and that do not require time-consuming installation processes.

Previously, it has been found that the incorporation of a polymer and/or fibres into the gypsum matrix of a gypsum plasterboard may help to increase the fixing strength of the board. Typically, the polymer and/or fibre component is mixed into the gypsum slurry used to form the plasterboard.

Surprisingly, it has now been found that in the case that polyvinyl acetate is incorporated in the gypsum matrix of a gypsum-based product, the fixing strength of the gypsum-based product may be enhanced still further if the polyvinyl acetate is provided in the form of a fine particle distribution.

Therefore, in a first aspect, the present invention may provide a method of preparing a gypsum-based product, comprising the steps of mixing calcined gypsum with polymer particles and water to provide a slurry, the polymer particles comprising principally polyvinyl acetate, wherein the polymer particles have a particle size distribution, measured using laser diffractometry, such that particles having a diameter of 4.5 µm or less provide at least 90% of the total particle volume.

Typically, the polymer particles are incorporated into the slurry in the form of a water-based emulsion. In such cases, the method may further comprise the step of incorporating a further quantity of water into the slurry, in addition to the water-based emulsion.

In a less-preferred alternative, the polymer particles may be incorporated into the slurry in a dry form, and water may be provided separately to form the slurry.

The particle size distribution of the polymer particles is determined using laser diffractometry measurement of the particle size when the particles are suspended in a water-based emulsion.

Preferably, the polymer particles have a particle size distribution, measured using laser diffractometry, such that particles having a diameter of 4 µm or less provide at least 90% of the total particle volume.

More preferably, the polymer particles have a particle size distribution, measured using laser diffractometry, such that particles having a diameter of 3.5 µm or less provide at least 90% of the total particle volume.

In certain cases, the particle size distribution of the polymer particles is monomodal (also known as unimodal).

Typically, the average polyvinyl acetate content of the particles is at least 80% by volume, preferably 85% by volume, more preferably 90% by volume.

In certain cases, the particles additionally comprise polyvinyl alcohol, which may be present as a surface layer extending partially or wholly around the exterior of the particle. The presence of polyvinyl alcohol is thought to be typically due to the partial hydrolysis of the polyvinyl acetate. It is thought that the presence of polyvinyl alcohol may assist in stabilising the polymer particles.

Typically, the polymer particles are present in the slurry in an amount of at least 1 wt % relative to the calcined gypsum, preferably at least 3 wt %, most preferably at least 4 wt %.

Typically, the polymer particles are present in the slurry in an amount of 25 wt % or less relative to the calcined gypsum, preferably 20 wt % or less, most preferably 15 wt % or less.

The calcined gypsum typically comprises calcium sulphate hemihydrate and/or calcium sulphate anhydrite. Calcium sulphate hemihydrate may be present in the alpha and/or the beta form.

Typically, the water gauge of the slurry (including any water that is provided as part of an emulsion of polymer particles and any water that is provided separately) is at least 40 wt % relative to the calcined gypsum, preferably at least 50 wt %, most preferably at least 60 wt % relative to the calcined gypsum. In general, lower water gauges (for example, down to 40 wt %) are achievable when the calcium sulphate hemihydrate is entirely or predominantly present in the alpha form, for example when at least 50 wt % of the calcium sulphate hemihydrate is present in the alpha form. Typically, higher water gauges (for example, at least 60 wt %) are required when the calcium sulphate hemihydrate is present entirely or predominantly in the beta form, for example, when at least 50 wt % of the calcium sulphate hemihydrate is present in the beta form.

Typically, the water gauge of the slurry is less than 120 wt % relative to the calcined gypsum, preferably less than 100 wt %.

Typically, the method further comprises the step of incorporating a fibrous reinforcement into the slurry, for example, glass fibres. In certain cases, the fibres of the fibrous reinforcement have an average length in the range 2-20 mm, typically 5-15 mm. In general, the fibrous reinforcement is present in the slurry in an amount of at least 1 wt % relative to the calcined gypsum, preferably at least 1.5 wt %, more preferably at least 2 wt %.

Typically, the fibrous reinforcement is present in the slurry in an amount of 15 wt % or less relative to the calcined gypsum, preferably 10 wt % or less, most preferably 5 wt % or less.

Typically, the method is used to produce a board whose core has a gypsum matrix. Typically, the board is provided with a liner on at least one face, for example, a paper liner or a glass fibre mat. The liner is typically partially or wholly embedded in the board. That is, during setting of the gypsum slurry to form the board, the gypsum slurry typically penetrates the liner partially or wholly.

Typically, the board has a screw pull-out strength of at least 550 N, preferably at least 600 N.

Other non-deleterious materials, adjuvants and ingredients may, when appropriate, be included in the slurry. Such non-deleterious materials may include optional further ingredients, such as polymers other than polyvinyl acetate or polyvinyl alcohol (including other synthetic polymers and/or starch); set accelerators and retarders; deformation inhibitors (such as anti-sagging agents); anti-shrink additives; recalcination inhibitors; foam stabilisers; bactericides; fungicides; pH adjusters; colouring agents; fire retardants; hydrophobic additives; and fillers (such as particulate mineral material or plastics, which may in some embodiments be in expanded form).

The invention will now be described by way of example with reference to the following Figures in which:

FIGS. 1(a) to 1(h) show graphical representations of the particle size distribution of Examples 1-8 respectively;

FIGS. 1(i) to 1(k) show graphical representations of the particle size distribution of Comparative Examples 9-11 respectively;

FIG. 2 shows screw pull out data for Examples 1-8 and Comparative Examples 9-11.

EXAMPLES

The volume-based particle size distributions of 11 samples of water-based polyvinyl acetate emulsions were determined and used to calculate the $D_{90}$ value for each sample.

Subsequently, the emulsions were each incorporated into a respective gypsum-based slurry, in an amount sufficient to provide a polyvinyl acetate content of 4.5 wt % relative to the calcined gypsum (measured by dry weight of the polyvinyl acetate). The slurry also contained fibre in an amount of 2.3 wt % relative to the calcined gypsum, and had a total water content sufficient to provide a water gauge of 80 wt % relative to the calcined gypsum. Each slurry was then formed into a respective gypsum board. The screw pull-out strength of each board was determined.

The results are shown are shown in Table 1. Additionally, graphical representations of the volume-based particle size distributions for each polyvinyl acetate sample are shown in FIGS. 1 (a)-(k), and the screw pull-out results are displayed graphically in FIG. 2.

TABLE 1

| Sample | $D_{90}$ (μm) | Screw pull-out strength of gypsum board (N) |
|---|---|---|
| Example 1 | 0.73 | 713 ± 47 |
| Example 2 | 3.08 | 691 ± 39 |
| Example 3 | 2.94 | 685 ± 60 |
| Example 4 | 2.90 | 689 ± 40 |
| Example 5 | 2.42 | 625 ± 35 |
| Example 6 | 3.53 | 612 ± 51 |
| Example 7 | 2.13 | 630 ± 63 |
| Example 8 | 2.93 | 612 ± 55 |
| Comparative Example 9 | 6.56 | 480 ± 69 |
| Comparative Example 10 | 7.28 | 476 ± 73 |
| Comparative Example 11 | 4.73 | 493 ± 74 |

Measurement of $D_{90}$ Value

The volume-based particle size distributions of aqueous polyvinyl acetate dispersions were measured using laser diffractometry, using a Malvern Mastersizer 3000 laser diffraction particle size analyser.

Polyvinyl acetate samples were diluted in water to produce an emulsion containing 4.5 wt % solids content polyvinyl acetate. The emulsion was shaken manually for one minute to ensure an even dispersion of the polymer before being pipetted into the dispersion unit of the analyser. The polymer emulsion was added in an amount to produce an obscuration of between 1% and 4%. The dispersion unit was stirred at 3000±50 rpm.

The analyser was operated in spherical particle mode.

Three samples were tested for each Example and Comparative Example, and six particle size distribution traces were taken for each sample. Thus, 18 tests were carried out for each Example and Comparative Example. The $D_{90}$ values in Table 1 represent the average taken from these 18 tests. The graphical representations of the particle size distribution shown in FIGS. 1(a) to 1(k) show the average of the six traces taken from one of the samples.

Production of Gypsum Board Samples

In the production of gypsum board samples, a gypsum slurry was prepared from stucco (calcined gypsum), glass fibres having an average length of 6 mm, a water-based polyvinyl acetate emulsion and additional water.

The fibre content of the slurry was 2.3 wt % relative to the stucco. The polyvinyl acetate emulsion was added to the slurry in an amount to provide a polyvinyl acetate content of 4.5 wt % relative to the stucco, excluding the water present in the emulsion. The water gauge of the slurry (including water from the polyvinyl acetate emulsion and additional water) was 80 wt % relative to the stucco.

The slurry was prepared by hand-mixing the required amount of water-based polyvinyl acetate emulsion with the additional water. Subsequently, the fibres were added to the diluted emulsion and mixed in for 30 s using a Kenwood mixer. After this, the stucco was added to the aqueous polyvinyl acetate/fibre mixture in the Kenwood mixer and mixed in for 30 s.

The slurry was poured into a mould that defined a planar cavity having opposed faces. The opposed faces of the cavity were lined with paper that was saturated with water. The mould was supported such that the cavity was in an upright orientation. The outer surface of the mould was tapped to remove any air pockets in the slurry, and further slurry poured into the cavity as necessary until it was full.

The slurry was left to set for 15-20 minutes, after which the mould was opened, and the gypsum board removed. Any excess paper was trimmed from the edges of the board, and masking tape wrapped around the edges of the boards.

25 minutes from the time the slurry was poured into the mould, the board was placed in an oven at 160° C. for an hour. Subsequently, the board was taken out of the oven, the masking tape removed from the edges of the board and the board placed in another oven at 40° C. for approximately 24 hours, until it reached constant mass.

Following this, the board was conditioned at 23° C. and 50% relative humidity for approximately 24 hours, until constant mass was achieved.

Measurement of Screw Pull-Out Strength

The screw pull-out test involves applying a pulling force to a screw that is embedded in a board, using a universal testing machine, until the screw becomes detached from the board.

Screw pull-out tests were carried out on the conditioned boards using Unifix single thread screws having a length of 50 mm and a shaft of 5 mm diameter. Before starting the pull-out test, the screw was inserted into the board such that 10 mm (±1 mm) of the screw extended from the rear of the board. A pre-load of 10N was applied, followed by increasing load at a cross-head speed of 10 mm/s until failure. The peak failure load was recorded to provide the pull-out strength.

The invention claimed is:

1. A method of preparing a gypsum-based product, comprising the steps of mixing calcined gypsum with polymer particles and water to provide a slurry, the polymer particles comprising principally polyvinyl acetate, wherein
    the polymer particles have a particle size distribution, measured using laser diffractometry, such that particles having a diameter of 4.5 μm or less provide at least 90% of the total particle volume,
    wherein the polymer particles are present in the slurry in an amount of 15 wt % or less relative to the calcined gypsum, and
    wherein the particles additionally comprise polyvinyl alcohol and the polyvinyl alcohol phase is present as a surface layer extending partially or wholly around the exterior of the particle.

2. The method of claim 1, wherein the polymer particles have a particle size distribution, measured using laser diffractometry, such that particles having a diameter of 4 μm or less provide at least 90% of the total particle volume.

3. The method of claim 2, wherein the polymer particles have a particle size distribution, measured using laser diffractometry, such that particles having a diameter of 3.5 μm or less provide at least 90% of the total particle volume.

4. The method of claim 1, wherein the average polyvinyl acetate content of the particles is at least 90% by volume.

5. The method of claim 1, wherein the polymer particles are provided in the form of a water-based emulsion.

6. The method of claim 5, further comprising the step of incorporating a further quantity of water into the slurry, in addition to the water-based emulsion.

7. The method of claim 1, wherein the polymer particles are present in the slurry in an amount of at least 1 wt % relative to the calcined gypsum.

8. The method of claim 1, further comprising the step of incorporating fibres into the slurry.

9. The method of claim 8, wherein the fibres are present in the slurry in an amount of at least 1 wt % relative to the calcined gypsum.

10. The method of claim 1, wherein the gypsum-based product is a board.

11. The method according to claim 10, wherein the board is provided with a liner on at least one face, wherein the liner is a paper liner or a glass fibre mat.

12. The method of claim 1, further comprising the steps of shaping the slurry and allowing to set to provide a gypsum plasterboard.

* * * * *